United States Patent [19]
Lalancette et al.

[11] Patent Number: 4,487,624
[45] Date of Patent: Dec. 11, 1984

[54] FERTILIZERS PELLETIZED WITH HYDRATED SULFATES

[75] Inventors: Jean M. Lalancette; Claude Ostiguy, both of Sherbrooke, Canada

[73] Assignee: Societe Nationale de L'Amiante, Quebec, Canada

[21] Appl. No.: 554,161

[22] Filed: Nov. 21, 1983

Related U.S. Application Data

[63] Continuation of Ser. No. 377,176, May 11, 1982, abandoned.

[51] Int. Cl.³ ............................................. C05D 5/00
[52] U.S. Cl. .................................. 71/32; 71/63; 71/64.03

[56] References Cited

U.S. PATENT DOCUMENTS 3,582,311  6/1971  Browder et al. ................. 71/63 X
3,926,609 12/1975  Effmert et al. .................. 71/63 X Primary Examiner—Ferris H. Lander
Attorney, Agent, or Firm—Cushman, Darby & Cushman

[57] ABSTRACT

The invention disclosed relates to the manufacture of compressed fertilizer pellets for dispensing sulfur and magnesium and at least one of the essential elements selected from nitrogen, potassium and phosphorous, the pellets are formed by compressing a compound containing at least one of the essential elements with a hydrated magnesium sulfate containing at least four moles of water of hydration.

8 Claims, No Drawings

FERTILIZERS PELLETIZED WITH HYDRATED SULFATES

This is a continuation of application Ser. No. 377,176, filed May 11, 1982, now abandoned.

BACKGROUND OF THE INVENTION

Fertilizers are materials which contain one or more nutrient elements essential for plant growth. Soil being the preponderant medium of plant growth, fertilizers are usually considered as soil amendments to alleviate natural deficiencies and/or to replace nutrients removed in cropping regimens. The bulk of plant tissue is comprised of carbon, hydrogen and oxygen. These elements are acquired from atmospheric carbon dioxide and soil water. Of the additional mineral elements found in plants, and obtained from the soil, twelve are presently considered essential.

The primary nutrients, utilized in large amounts and most likely to be limiting to plant growth, are nitrogen, phosphorus and potassium. The fertilizer industry has been built principally on supplying materials containing these primary nutrients, either singly or in combinations. Calcium, magnesium and sulfur are also used by plants in relatively large amounts, but on most soils are not as apt to be limiting, and hence are called secondary nutrients. Iron, copper, manganese, boron, zinc and molybdenum constitute the so-called minor or trace nutrients, essential to plant growth in minute amounts. Other elements are being scrutinized continuously for their influence on plants, and it is possible that the list of essential nutrients may be extended.

Materials which have been utilized to supply plant food elements may be classified broadly as: by-products and wastes of other industries; natural organics; natural minerals; refined minerals; and manufactured chemicals. Representatives of these classes are either applied directly to the soil as so-called separate materials or are used in various combinations in the manufacture of mixed fertilizers. Separate materials may supply more than one nutrient element, either primary, secondary or trace, whereas mixed goods always contain two or more primary nutrients and may contain other essential elements as well. The fertilizer industry of today is primarily a chemical industry, and plant food mixtures are produced from chemicals readily available to plants.

When it is desired to provide a fertilizer capable of dispensing sulfur, magnesium and potassium one has two choices. One choice comprises selecting any of the natural minerals containing sulfur, magnesium and potassium such as langbeinite or kainite. Langbeinite is found in the State of New Mexico, U.S.A., Germany and India but in its natural state it also contains sodium chloride so that before it can be used as an agricultural fertilizer it must be stripped of its sodium chloride. Langbeinite has the formula $K_2SO_4.2MgSO_4$. Another natural mineral which is available in kainite having the formula $KCl.MgSO_4.3H_2O$ and is mined for agricultural purposes. One advantage of these natural mixed salts is their stability in the presence of moisture so that once these products have been pelletized their stability to humid conditions makes them suitable for use in fertilizer dispensing machines without the production of appreciable amounts of fines which cause clogging problems to such dispensing equipment and without hydration which weakens the crystalline structure.

The other choice is to reproduce the elements of langbeinite or kainite by chemical mixture. It has been found that a mixture of potassium sulfate and magnesium sulfate to reproduce langbeinite cannot be pelletized unless some of the binding agents normally used in the art of making tablets or pellets are incorporated in the mixture. Also when attempting to reproduce kainite by mixing potassium chloride and trihydrated magnesium sulfate it has been found that though this mixture can be pelletized without the aid of binding agents, the compressed mixture or pellet when let standing in air absorbs too much humidity so that there is a substantial gain in weight of the pellet in the order of 12 to 25% with the end result that such a tablet or pellet does not possess sufficient strength to resist the handling by pellet-dispensing machines.

Furthermore since the availability of natural salts such as langbeinite and kainite is limited, and and since, in the case of langbeinite, the cost of transportation to North American markets would render this product less competitive in such markets it would thus appear that it would be highly desirable if these desired salts could be made locally in the absence of bining agents in such a manner as to be suitable for use in regular pellet-dispensing machines.

SUMMARY OF THE INVENTION

In accordance with the present invention it has now been surprisingly found that a mixture of potassium sulfate and magnesium sulfate, and a mixture of potassium chloride and magnesium sulfate can be compressed into pellets in the absence of binding agent when using magnesium sulfate crystallized with at least 4 moles of water.

The pellets prepared in accordance with the present invention possess the required physical properties for use in pellet fertilizer dispensing machines i.e. sufficient hardness and mechanical strength for handling and limited water absorption under atmospheric humid conditions.

DETAILED DESCRIPTION OF THE INVENTION

As stated previously, attempts to reproduce langbeinite by mixing $K_2SO_4$ with 2 moles of $MgSO_4$ have produced a mixture which cannot be compressed into a unit. It appears that potassium sulfate and magnesium sulfate and mixtures thereof do not possess any binding capacity as can be seen from Table I.

TABLE I

|  | Pelletizing ability under pressure of 10,186 psi |
|---|---|
| $K_2SO_4$ | nil |
| $MgSO_4$ | nil |
| Mixture of $K_2SO_4$ and $MgSO_4$ | nil |

On the other hand, attempts to reproduce kainite by mixing KCl with $MgSO_4.3H_2O$ provide a compressed unit which can be extruded from a mold but which possesses very low strength even when up to five moles of trihydrated magnesium sulfate are used. From these results it appears that a pellet prepared with trihydrated magnesium sulfate and potassium chloride cannot withstand a pressure at rupture higher than 9 kg/cm² as can be seen in Table II.

TABLE II

| mole KCl | mole(s) MgSO$_4$.3H$_2$O | Pressure rupture in kg/cm$^2$ |
|---|---|---|
| 1 | 1 | 3.84 |
|   |   | 6.51 |
| 1 | 2 | 9.08 |
|   |   | 4.14 |
| 1 | 3 | 0.85 |
|   |   | 7.00 |
| 1 | 4 | 1.84 |
|   |   | 1.48 |
| 1 | 5 | 1.68 |
|   |   | 4.93 |

From the result of Tables I and II it appears that naturally occurring mixed crystalline salts such as those found in langbeinite and kainite cannot be duplicated by simple mixing the two salts in crystalline form and compressing the mixture.

In accordance with the present invention it has been surprisingly found that pellets prepared by compressing a mixture of magnesium sulfate containing at least four molecules of water and potassium sulfate or potassium chloride there is obtained a pellet which surprisingly possesses an unexpected higher resistance to pressure accompanied by unexpectedly low water absorption under high humid conditions.

The pellets prepared in accordance with the present invention are suitable for use in dispensing potassium, sulfur and magnesium as fertilizer to the soil and can radily be used in fertilizer dispensing machine. The unexpected hardness and stability under humid conditions of the tablets or pellets of the present invention render them suitable for handling without breakage and production of fines.

The tablets or pellets of the present invention are prepared by mixing the magnesium sulfate having at least four moles of water with potassium sulfate or potassium chloride and after thorough mixing the mixture is fed to a pelletizer or a tabletting machine as is well known in the art. In general the pressure applied to the punch is about 5,000 to 25,000 psi with a preferred pressure of between about 5,000 to about 10,000 psi. The size of the tablets or pellets may vary from 0.5 to 5.0 mm.

In some cases it may be desirable to dispense to the soil other nutrient such as nitrogen and/or phosphorous. In such cases it is possible to incorporate into the mixture making up the tablets or pellets of the present invention either a nitrogen-containing salt, a phosphorus-containing salt or a mixture thereof or a nitrogen- and phosphorus-containing salt which are known in the fertilizer field to be suitable for supplying nitrogen and/or phosphorus to the soil.

As an example of suitable nitrogen-containing salt there may be mentioned urea, sodium nitrate and ammonium chloride while dipotassium phosphate, and calcium phosphate are suitable for supplying phosphorous. Monobasic and dibasic ammonium phosphate are suitable for supplying nitrogen and phosphorous.

As far as the hydrated magnesium sulfate used in accordance with the present invention is concerned there is used magnesium sulfate having from 4 to 7 moles of water of crystallization. Thus the magnesium sulfate tetrahydrate, pentahydrate, hexahydrate and heptahydrate, can be used with the heptahydrate being preferred. The molar ratio of potassium sulfate or potassium chloride to hydrated magnesium sulfate may be from 1:1 to 1:5.

EXAMPLE

The materials shown in Table III were ground to −100 mesh and each mixture was divided in lots of 500 g and homogenized in a rotating cone mixer for two hours. Each lot was then compressed at a pressure of 10,186 psi in a cylindrical steel die having a diameter of one inch and the formed pellet obtained were two inches in height. The pressure was applied with a calibrated Tinius-Olsen press for five minutes at room temperature and the pellets were extruded through the bottom of the die.

The mechanical strength of the extruded pellets was measured on an Instron ® apparatus, model 1123 and is reported in Table III.

TABLE III

| Ex. | Mixtures | Molar ratio | Pressure supported at rupture (Kg/cm$^2$) |
|---|---|---|---|
| 1 | MgSO$_4$.7H$_2$O | 1 | 45.8 |
|   | K$_2$SO$_4$ | 1 |  |
| 2 | MgSO$_4$.7H$_2$O | 2 | 72 |
|   | K$_2$SO$_4$ | 1 |  |
| 3 | MgSO$_4$.7H$_2$O | 3 | 45.8 |
|   | KCl | 1 |  |
| 4 | MgSO$_4$.7H$_2$O | 4 | 42.4 |
|   | KCl | 1 |  |
| 5 | MgSO$_4$.7H$_2$O | 5 | 56.8 |
|   | KCl | 1 |  |
| 6 | MgSO$_4$.7H$_2$O | 1 | 40.65 |
|   | NaNO$_3$ | 1 |  |
| 7 | MgSO$_4$.7H$_2$O | 1 | 46.18 |
|   | KNO$_3$ | 1 |  |
| 8 | MgSO$_4$.7H$_2$O | 1 | 41.64 |
|   | NH$_4$Cl | 1 |  |
| 9 | MgSO$_4$.7H$_2$O | 4 | 42.04 |
|   | K$_2$HPO$_4$ | 2 |  |
|   | KNO$_3$ | 1 |  |
| 10 | MgSO$_4$.3H$_2$O | 1 | 3.19 |
|   | K$_2$SO$_4$ | 1 |  |
| 11 | MgSO$_4$.3H$_2$O | 2 | 3.57 |
|   | K$_2$SO$_4$ | 1 |  |

It will be noted that the resistance to pressure is more than significantly higher in the pellets prepared with magnesium sulfate heptahydrate of Examples 1–9 than in the pellets prepared with magnesium sulfate trihydrate of Examples 10 and 11.

Resistance to moisture was determined by placing the extruded pellets in a 100% moisture atmosphere at 25° C. and measuring the weight gain until constant weight is observed. Results are reported in Table IV.

TABLE IV

MECHANICAL STRENGTH OF PELLETIZED MIXTURES AFTER EQUILIBRIUM IN 100% MOISTURE ATMOSPHERE AT 25° C. COMPRESSED AT 716 Kg/cm$^2$ (10,861 psi)

| Ex. | Product mixtures | Molar ratio | Initial weight (g) | Final weight at equilibrium (g) | Gain in weight (%) | Pressure at rupture (Kg/cm$^2$) |
|---|---|---|---|---|---|---|
| 12 | KCl | 1 | 35.29 | 42.48 | 20.37 | 3.84 |
|   | MgSO$_4$.3H$_2$O | 1 | 35.34 | 41.98 | 18.79 | 6.51 |
| 13 | KCl | 1 | 34.77 | 41.40 | 19.07 | 9.08 |
|   | MgSO$_4$.3H$_2$O | 2 | 32.74 | 40.46 | 23.58 | 4.14 |
| 14 | KCl | 1 | 32.64 | 40.31 | 23.49 | 0.85 |
|   | MgSO$_4$.3H$_2$O | 3 | 32.04 | 38.48 | 20.09 | 7.00 |
| 15 | KCl | 1 | 31.47 | 39.67 | 26.06 | 1.84 |
|   | MgSO$_4$.3H$_2$O | 4 | 31.86 | 39.99 | 25.52 | 1.48 |
| 16 | KCl | 5 | 33.80 | 41.13 | 21.68 | 1.68 |
|   | MgSO$_4$.3H$_2$O | 1 | 32.20 | 37.12 | 15.28 | 4.93 |
| 17 | KCl | 1 | 37.02 | 37.38 | 0.90 | 24.08 |

TABLE IV-continued

MECHANICAL STRENGTH OF PELLETIZED MIXTURES
AFTER EQUILIBRIUM IN 100% MOISTURE ATMOSPHERE
AT 25° C. COMPRESSED AT 716 Kg/cm² (10,861 psi)

| Ex. | Product mixtures | Molar ratio | Initial weight (g) | Final weight at equilibrium (g) | Gain in weight (%) | Pressure at rupture (Kg/cm²) |
|---|---|---|---|---|---|---|
| 18 | $MgSO_4.7H_2O$ | 1 | 40.96 | 41.32 | 0.87 | 20.72 |
|    | KCl | 1 | 37.40 | 37.55 | 0.40 | 34.54 |
| 19 | $MgSO_4.7H_2O$ | 2 | 37.93 | 38.14 | 0.55 | 46.18 |
|    | KCl | 1 | 37.32 | 38.31 | 2.65 | 9.47 |
| 20 | $MgSO_4.7H_2O$ | 3 | 36.96 | 38.01 | 2.84 | 5.33 |
|    | KCl | 1 | 35.27 | 37.04 | 5.02 | 7.89 |
| 21 | $MgSO_4.7H_2O$ | 4 | 37.17 | 39.33 | 5.81 | 7.10 |
|    | KCl | 1 | 38.30 | 39.19 | 2.32 | 8.09 |
| 22 | $MgSO_4.7H_2O$ | 5 | 37.34 | 38.13 | 2.12 | 14.80 |
|    | $K_2SO_4$ | 1 | 41.16 | 46.11 | 12.03 | 0.47 |
| 23 | $MgSO_4.3H_2O$ | 1 | 42.26 | 47.79 | 13.08 | 0.63 |
|    | $K_2SO_4$ | 1 | 37.22 | 43.03 | 15.61 | 1.97 |
| 24 | $MgSO_4.3H_2O$ | 2 | 37.80 | 42.75 | 13.09 | 0.79 |
|    | $K_2SO_4$ | 1 | 41.61 | 41.77 | 0.38 | 42.04 |
|    | $MgSO_4.7H_2O$ | 1 | 43.28 | 43.58 | 0.69 | 27.63 |
| 25 | $K_2SO_4$ | 1 | 36.74 | 37.93 | 3.24 | 18.35 |
|    | $MgSO_4.7H_2O$ | 1 | 38.82 | 39.98 | 2.98 | 28.81 |

It will be noted that the pellets of Examples 17–21 and 24 and 25 have an unexpected resistance to humidity when compared with the pellets made from magnesium sulfate trihydrate of Examples 1–16 and 22 and 23.

Hardness was determined with a needle durometer, model D (Shore Instruments) and reported in Table V as Rockwell numbers.

TABLE V

| HARDNESS* | |
|---|---|
| Product mixture | Hardness |
| $KCl.MgSO_4.3H_2O$ | 3.1 |
| $KCl.2(MgSO_4.3H_2O)$ | 3.55 |
| $KCl.3(MgSO_4.3H_2O)$ | 2.35 |
| $KCl.4(MgSO_4.3H_2O)$ | 2.9 |
| $KCl.5(MgSO_4.3H_2O)$ | 3.35 |
| $KCl.MgSO_4.7H_2O$ | 4.6 |
| $KCl.2(MgSO_4.7H_2O)$ | 5.6 |
| $KCl.3(MgSO_4.7H_2O)$ | 5.2 |
| $KCl.4(MgSO_4.7H_2O)$ | 5.2 |
| $KCl.5(MgSO_4.7H_2O)$ | 6.2 |
| $K_2SO_4.MgSO_4.3H_2O$ | 1.0 |
| $K_2SO_4.(MgSO_4.3H_2O)$ | 2.1 |
| $K_2SO_4.MgSO_4.7H_2O$ | 4.6 |

TABLE V-continued

| HARDNESS* | |
|---|---|
| Product mixture | Hardness |
| $K_2SO_4.(MgSO_4.7H_2O)$ | 6.6 |

*Measurement made at half height of extruded cylinder at 716 Kg/cm². Average of four measurements.

The superior hardness of pellets prepared from magnesium sulfate heptahydrate over those prepared from magnesium sulfate trihydrate indicates that the pellets of the present invention are more resistant to handling. The water content of the final product varies from 29.97% with $MgSO_4.7H_2O.KCl$ in Example 1 see Table III to 48.24% with $5MgSO_4.35H_2O.KCl$ in Example 5, see Table III. The hardness ranges from 4.6 to 6.6 and a compression resistance of from 7.62 to 7.20 kg/cm².

We claim:

1. A compressed fertilizer unit for dispensing sulfur and magnesium and at least one of the essential elements selected from nitrogen, potassium and phosphorus, said unit being characterized by the absence of binding agent, comprising a compressed homogeneous mixture of
    (a) a hydrated magnesium sulfate containing at least four moles of water of hydration, and
    (b) at least one fertilizer compound capable of releasing at least one of the essential elements selected from nitrogen, potassium and phosphorus, the ratio of (a) to (b) being from 1:1 to 5:1, and wherein the final product has a water content of from 29.97% to 48.24%, a Rockwell hardness of from 4.6 to 6.6 and a compression resistance of from 20.72 to 72.0 Kg/cm².

2. The compressed fertilizer unit of claim 1, wherein the hydrated magnesium sulfate is magnesium heptahydrate.

3. The compressed fertilizer unit of claim 1, wherein the hydrated magnesium sulfate is magnesium pentahydrate.

4. The compressed fertilizer unit of claims 1, 2 or 3, wherein the fertilizer compound capable of releasing potassium is potassium chloride.

5. The compressed fertilizer unit of claims 1, 2 or 3, wherein the fertilizer compound capable of releasing potassium is potassium sulfate.

6. The compressed fertilizer unit of claims 1, 2 or 3, wherein the fertilizer compound capable of releasing nitrogen is sodium or potassium nitrite.

7. The compressed fertilizer unit of claims 1, 2 or 3 wherein the fertilizer compound capable of releasing phosphorus is monohydrogen orthophosphate.

8. The compressed fertilizer unit of claim 1 wherein the hydrated magnesium sulfate has four to seven moles of water of hydration.

* * * * *